US009911162B2

(12) United States Patent
Byron et al.

(10) Patent No.: US 9,911,162 B2
(45) Date of Patent: Mar. 6, 2018

(54) COGNITIVE MARKETING BASED ON SOCIAL NETWORKING OF POSITIVE REVIEWERS

(71) Applicant: International Business Machines Corporation, Armonk, NY (US)

(72) Inventors: Donna K. Byron, Petersham, MA (US); Sarbajit K. Rakshit, Kolkata (IN); Craig M. Trim, Sylmar, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/884,170

(22) Filed: Oct. 15, 2015

(65) Prior Publication Data

US 2017/0109838 A1 Apr. 20, 2017

(51) Int. Cl.
*G06Q 50/00* (2012.01)
*G06F 17/30* (2006.01)
*G06Q 30/06* (2012.01)

(52) U.S. Cl.
CPC ....... *G06Q 50/01* (2013.01); *G06F 17/30345* (2013.01); *G06Q 30/0631* (2013.01)

(58) Field of Classification Search
CPC .......................... G06Q 30/0282; G06Q 50/01
USPC ................................................ 705/26.7, 319
See application file for complete search history.

(56) References Cited

U.S. PATENT DOCUMENTS

| | | | |
|---|---|---|---|
| 6,807,566 B1* | 10/2004 | Bates | H04L 51/12 709/206 |
| 7,822,631 B1* | 10/2010 | Vander Mey | G06F 17/30038 705/7.29 |
| 7,827,052 B2 | 11/2010 | Scott et al. | |
| 8,150,842 B2 | 4/2012 | Brougher et al. | |
| 8,600,796 B1 | 12/2013 | Sterne et al. | |
| 8,645,396 B2 | 2/2014 | McNally et al. | |

(Continued)

OTHER PUBLICATIONS

Abdel-Hafez, A. et al., "Ontololgy-Based Product's Reputation Model", 2013 IEEE/WIC/ACM International Joint Conferences on Web Intelligence (WI) and Intelligent Agent Technologies (IAT), pp. 37-40, IEEE Computer Society, DOI 10.1109/WI-IAT.2013.146, printed: Feb. 6, 2015, © 2013 IEEE.

(Continued)

*Primary Examiner* — Mila Airapetian
(74) *Attorney, Agent, or Firm* — Daniel R. Simek (57) ABSTRACT

A method for online marketing provides that one or more processors receive content from an online social media site that is a review of a product of a product type. One or more processors determine a reviewer of the content that generates at least one positive review associated with the product of the product type and determines a reputation score of the reviewer based, at least in part, on the quantity of positive reviews and response data associated with the positive reviews, and one or more processors determine whether the reputation score of the reviewer of the at least one positive product review meets a predetermined threshold condition.

19 Claims, 4 Drawing Sheets

(56) References Cited

U.S. PATENT DOCUMENTS

| | | | |
|---|---|---|---|
| 2007/0192169 A1* | 8/2007 | Herbrich | G06Q 30/0282 705/347 |
| 2008/0288481 A1 | 11/2008 | Zeng et al. | |
| 2009/0199104 A1* | 8/2009 | Pluschkell, Jr. | G06Q 10/10 715/733 |
| 2012/0150631 A1 | 6/2012 | Root et al. | |
| 2012/0210240 A1* | 8/2012 | Neystadt | G06Q 30/0282 715/739 |
| 2013/0117261 A1* | 5/2013 | Sambrani | G06F 17/30867 707/734 |
| 2013/0117329 A1 | 5/2013 | Bank et al. | |
| 2013/0166379 A1 | 6/2013 | Ehindero et al. | |
| 2013/0325550 A1* | 12/2013 | Varghese | G06Q 30/02 705/7.31 |
| 2014/0351257 A1* | 11/2014 | Zuzik | H04L 67/10 707/740 |
| 2015/0074033 A1* | 3/2015 | Shah | G06N 5/02 706/46 |
| 2016/0125751 A1* | 5/2016 | Barker | G06F 17/3053 434/322 |
| 2016/0196561 A1* | 7/2016 | Iyer | G06Q 50/01 705/304 |

OTHER PUBLICATIONS

Jensen, et al., "Credibility of Anonymous Online Product Reviews: A Language Expectancy Perspective", Journal of Management Information Systems, Summer 2013, vol. 30, No. 1, pp. 293-323, DOI: 10.2753/MIS0742-1222300109, printed: Feb. 6, 2015, © 2013 M.E. Sharpe, Inc.

"Amazon Vine", Wikipedia, the free encyclopedia, this page last modified on Dec. 17, 2014, printed: Feb. 6, 2015, 3 pages, <http://en.wikipedia.org/wiki/Amazon_Vine>.

"System, Method or Apparatus for Exchanging Knowledge, Information, Products or an Entity(ies) of Value, and Real Time Market and/or Individual Sensitive of Responsive System of Education", An IP.com Priort Art Database Technical Disclosure, IP.com No. 000177784, IP.com Electronic Publication: Jan. 1, 2009, Copyright: Mark Samuel Depalma Â© 2008, 14 pages, <http://ip.com/IPCOM/000177784>.

"Unsupervised detection of representative reviewers from Product reviews", An IP.com Prior Art Database Technical Disclosure, Authors et. al.: Disclosed Anonymously, IP.com No. 000232660, IP.com Electronic Publication: Nov. 25, 2013, 6 pages, <http://ip.com/IPCOM/000232660>.

* cited by examiner

COGNITIVE MARKETING BASED ON SOCIAL NETWORKING OF POSITIVE REVIEWERS

BACKGROUND OF THE INVENTION

The present invention relates generally to the field of online marketing, and more particularly to a method of marketing by selection of positive social networking reviewers.

Retail businesses often create online marketing campaigns to target existing and potential customers based on tracking of their expressed interests, by search history and/or previous purchases. Additionally, online marketing may also target customers that have made a purchase, or are in the process of making a purchase, by presenting additional products based on additional searches and purchases other customers have made that have purchased the same product Being able to focus marketing efforts on target audiences with a higher propensity of purchasing a particular product or type of product, can improve sales and reduce marketing and advertising costs.

SUMMARY

Embodiments of the present invention disclose a method, computer program product, and system for online marketing. The method for online marketing provides that one or more processors receives content from an online social media site associated with a product type, in which the content of the online social media site is a review of a product of the product type. One or more processors determines a reviewer of the content of the online social media site, in which the reviewer generates at least one positive review associated with the product of the product type. One or more processors determines a reputation score of the reviewer that generates the at least one positive review associated with the product of the product type based, at least in part, on the quantity of positive reviews that are generated and response data associated with the positive reviews, and one or more processors determines whether the reputation score of the reviewer of the at least one positive product review of the product type meets a predetermined threshold condition.

DETAILED DESCRIPTION

Embodiments of the present invention recognize that reviews and comments posted to social media sites or publicly viewed web pages may be more valuable to manufacturers of products and providers of service and information than the revenue obtained by the purchases of the contributors of the posted reviews and comments. Attracting customers that provide positive online commentary that may be further propagated and shared by the providing business, serves as an online marketing presence with a propensity of wide coverage thanks to the interconnection between users of social media.

Embodiments of the present invention provide a method, computer program product, and computer system for online marketing of products, services and information, based on searching online social media sites for commentary associated with a product, service, or information, determining the social media site contributors, sometimes referred to as reviewers, which generate positive reviews, and identifying the contributors of the positive reviews having a reputation score based on the response data associated with the contributor's review postings. Embodiments of the present invention include providing reviewers that have reputation scores meeting a pre-defined threshold condition with previews of a product, service, or information, to obtain an online review, and if positive, share and propagate the review to generate sales and/or demand. Hereafter, to maintain simplicity and brevity, discussion of embodiments of the present invention may refer to reviews and comments associated with a product; however, embodiments of the present invention are not limited to products, but may also apply to services, information, or other entities used and/or consumed by customers/clients.

Figure 1:
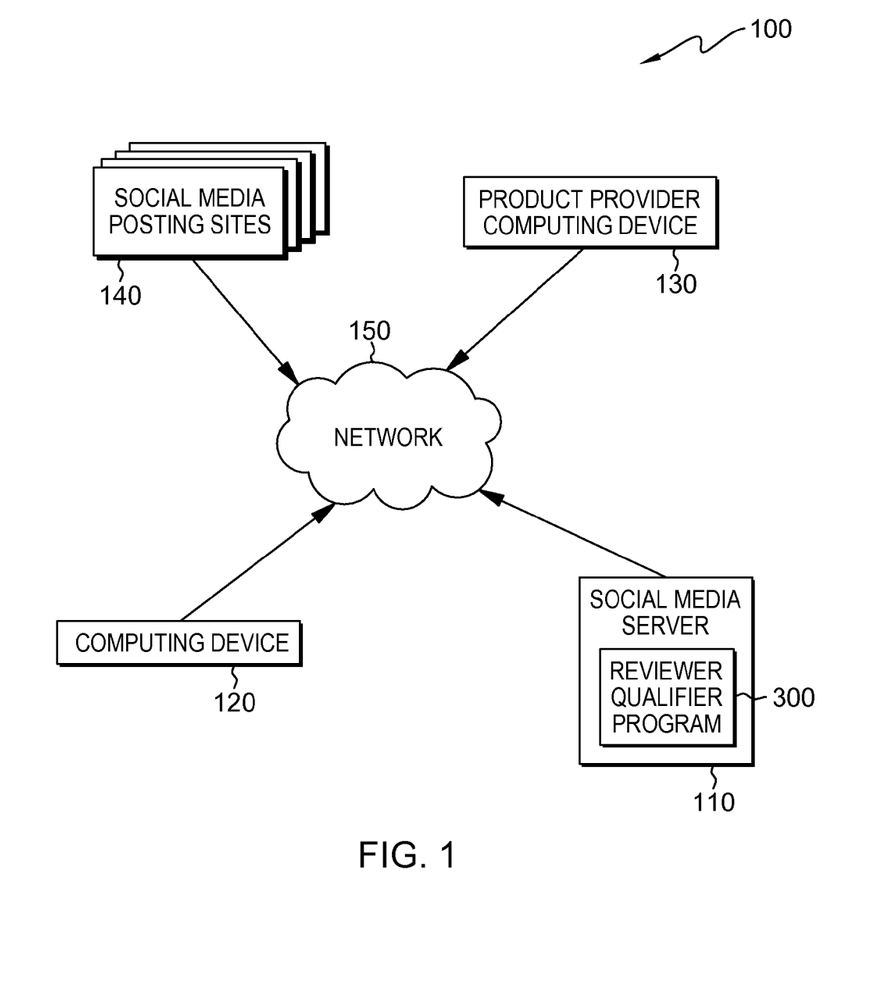
FIG. 1 is a functional block diagram illustrating a distributed computer processing environment, in accordance with an embodiment of the present invention.

The present invention will now be described in detail with reference to the Figures (FIGS.). FIG. 1 is a functional block diagram illustrating a distributed computer processing environment, generally designated 100, in accordance with an embodiment of the present invention. Distributed computer processing environment 100 includes social media server 110, which is depicted as hosting reviewer qualifier program 300, computing device 120, product provider computing device 130, and social media posting sites 140, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between social media server 110, computing device 120, social media posting sites 140 and product provider computing device 130, in accordance with embodiments of the present invention.

Social media server 110 is a computing device supporting one or more social media applications and has access to content of one or more social media posted sites. In some embodiments of the present invention, social media server 110 operates reviewer qualifier program 300 and may host reviewer qualifier program 300 as depicted in FIG. 1. In other embodiments, social media server 110 accesses reviewer qualifier program 300 remotely via network 150. In some embodiments, social media server 110 may be a management server, a web server, a mobile computing device, or any other electronic device or computing system capable of receiving and sending data. In other embodiments, social media server 110 may represent a virtual computing device of a computing system utilizing multiple computers as a server system, such as in a cloud computing environment. In still other embodiments, social media server 110 may be a laptop computer, a tablet computer, a netbook computer, a personal computer (PC), a desktop computer, a personal digital assistant (PDA), a smart phone, or any programmable electronic device capable of performing the operational steps of reviewer qualifier program 300. In yet other embodiments, social media server 110 represents a computing system utilizing clustered computers and components (e.g., database server computers, application server computers, etc.) that act as a single pool of seamless resources when accessed within distributed computer processing environment 100. Social media server 110 may include internal and external hardware components, as depicted and described with reference to FIG. 4.

Reviewer qualifier program 300 searches online social media content, such as the content of social media posting sites 140, and determines whether posted content refers to a review of a product, service, or information, or other entity used and/or consumed by a customer/client. In some embodiments of the present invention, reviewer qualifier program 300 may be associated with the content of a single social media site, whereas in other embodiments, reviewer qualifier program 300 may be hosted on a server with access to the content of multiple social media sites. In yet other embodiments, reviewer qualifier program 300 may operate from a provider computing device, such as product provider computing device 130, and receive social media content as a subscription from social media site providers, such as social media posting sites 140. Reviewer qualifier program 300 determines contributors of reviews of products, services, or information, determines whether the reviews are positive, generates a reputation score for the review contributor (hereafter the "reviewer"), and determines whether the reputation score meets a pre-determined threshold condition (e.g. greater than a pre-determined reputation score). Reviewers having reputation scores meeting the reputation score threshold condition are identified to providers of products, services, and information. In some embodiments of the present invention, in response to determining that a subsequent review by the qualified reviewer regarding a product of the provider is positive, reviewer qualifier program 300 distributes and shares the positive review online.

Some embodiments of the present invention provide a method, computer program product, and system, to receive and review content of social media and identify the potential one or more positive product reviewers based on reputation score. In some embodiments the product reviewers will be classified based on a category of product to which their social media contribution (review) is directed. The reputation of the product reviewer is determined based on various factors associated with the social media contribution content. The reputation score of any reviewer is an indicator of a population of social media readers that are interested or depend on, or are influenced by, the reviewer's contribution and feedback, or an indication of an extent to which a positive impact is created among potential customers. For example, a determination of a reputation score may include one or combinations of:

The quantity of product reviews done for the same product category.
The quantity of people indicating "likes", "shares", and "views" of the review.
The quantity of review recommendations, questions, comments.
Relationship of the reviewer with the product manufacturer.
Effectiveness of the reviewer to create positive sentiment within social media.
In some embodiments of the present invention, a reputation score for a reviewer may consider one, some, or all product reviews contributed by the reviewer.

In some embodiments of the present invention, at a point in time when a product is approaching an availability date, the manufacturer of the product may send a sample of a second product as a preview, or perhaps a URL link to web content of the product for proactive review by the positive reviewer having a reputation score that meets a pre-defined threshold condition. When the product review is complete and the review posted on a social media site, the review, (if positive), may be more publicly promoted (by the manufacturer) via use of additional social networks, and can be associated with advertisement of the product. In addition, some embodiments of the present invention perform content analysis of social media content to determine positive product reviews and promote the positive review more broadly to the public. For example, some embodiment may identify reviewers who are likely to post a positively-oriented review or commentary of a particular product. Those identified online reviewers are sent enticements such as coupons or VIP links to perform reviews of the particular product, and need not have previously posted review content regarding the products from the company providing the particular product to review.

Computing device 120 is a user device from which a user may access social media posting sites 140. Computing device 120 is operated by a user to read and post content to social media posting sites 140. In some embodiments, computing device 120 may be a mobile computing device, a laptop computer, a tablet computer, a netbook computer, a personal computer (PC), a desktop computer, a personal digital assistant (PDA), a smart phone, or any programmable electronic device capable of performing the operational steps of reviewer qualifier program 300. In another embodiment, computing device 120 represents a computing system utilizing clustered computers and components (e.g., database server computers, application server computers, etc.) that act as a single pool of seamless resources when accessed within distributed computer processing environment 100. In other embodiments, computing device 120 may represent a virtual computing device of a computing system utilizing multiple computers as a server system, such as in a cloud computing environment. Computing device 120 may include internal and external hardware components, as depicted and described with reference to FIG. 4.

Product provider computing device 130 is associated with a manufacturer of a product, a provider of a service, or a provider of information, and receives results from reviewer qualifier program 300 identifying contributors of positive reviews and qualifying with reputation scores that meets a pre-determined threshold condition. Product provider computing device 130 may also be used to contact qualified review contributors to offer a preview of products, services, or information for the contributor to review. In some embodiments, product provider computing device 130 may be a mobile computing device, a laptop computer, a tablet computer, a netbook computer, a personal computer (PC), a desktop computer, a personal digital assistant (PDA), a smart phone, or any programmable electronic device capable of receiving contributor results from reviewer qualifier program 300, and contacting contributors of reviews, and in some embodiments, providing a preview of information, such as information included in online web pages or web sites, product information or access to products, and service information or access to services. In another embodiment, product provider computing device 130 represents a computing system utilizing clustered computers and components (e.g., database server computers, application server computers, etc.) that act as a single pool of seamless resources when accessed within distributed computer processing environment 100. In other embodiments, product provider computing device 130 may represent a virtual computing device of a computing system utilizing multiple computers as a server system, such as in a cloud computing environment. Product provider computing device 130 may include internal and external hardware components, as depicted and described with reference to FIG. 4.

Social media posting sites 140 represents a plurality of social media sites, hosted and supported by web servers, on which reviewers post reviews of products, services, and information they have consumed. Social media posting sites 140 may include, but are not limited to, blogs, retail purchase reviews, product category sites, question-answer sites, short messaging sites, and commentary on existing posted content.

Figure 2:
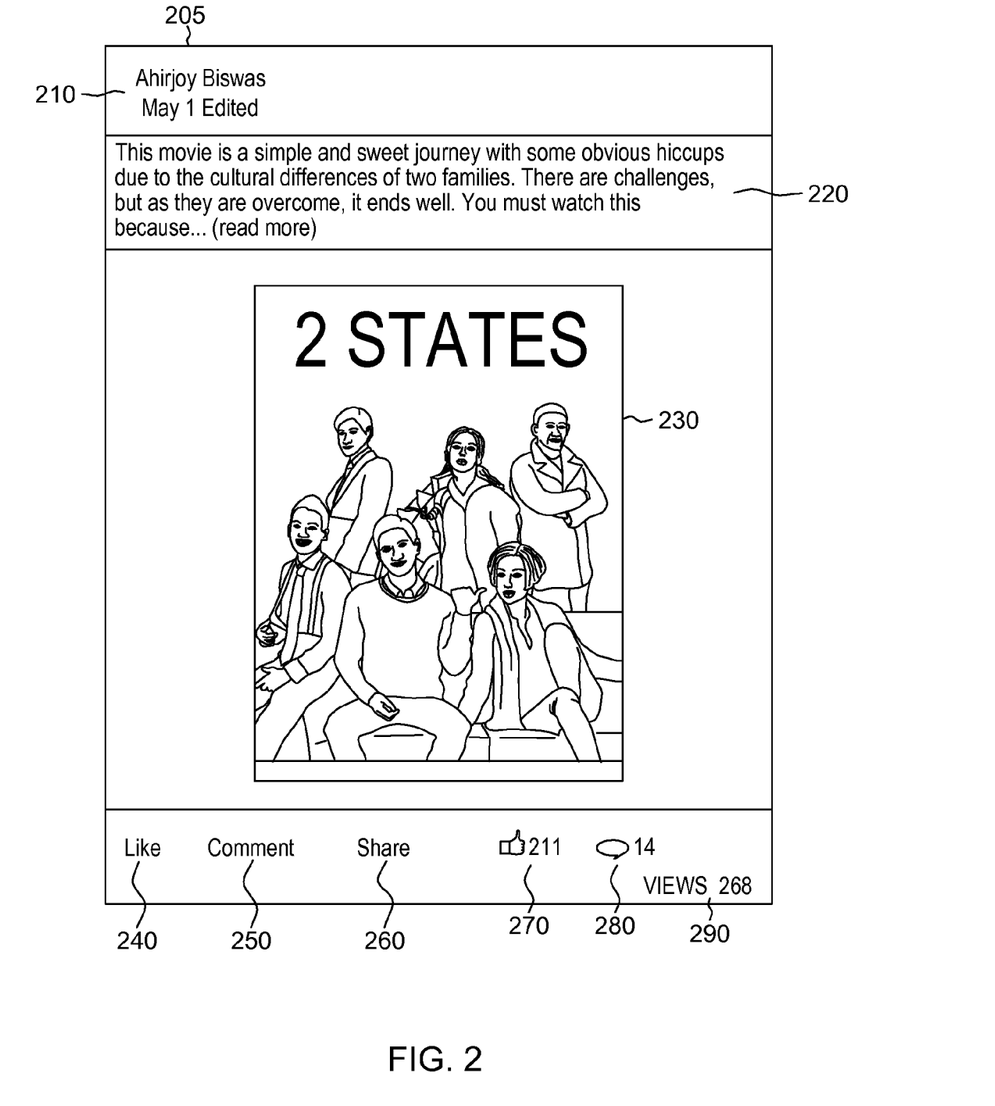
FIG. 2 is an exemplary online posting of a movie review, in accordance with an embodiment of the present invention.

FIG. 2 is an exemplary posting of online review 205, in accordance with an embodiment of the present invention. FIG. 2 includes online review 205, which includes contributor information 210, review content 220, product image 230, "like" selection 240, "comment" selection 250, "share" selection 260, total "likes" 270, total "comments" 280, and total "views" 290.

The exemplary posting includes online review 205 in which product image 230 is included showing a title and image of character actors for a movie, which in this example is the product being reviewed. Online review 205 includes a section in which contributor information 210 indicates identification information about the reviewer. In some embodiments, the information may be a logon identification (ID) for the particular site, or may be a contact link of the contributor. In some embodiments, contributor information 210 may include date/time information associated with the review, or may indicate whether the review is an original posting or an edited version.

Review content 220 includes the information provided by the reviewer, associated with the product which is reviewed. In some embodiments of the present invention, review content 220 is primarily text, but may include symbols, graphics, images, or emoticons reflecting impressions or attitudes of the reviewer towards the product reviewed. As depicted, the display of review content 220 may be abbreviated within the display of the posting, and include a link to expand the content if a user wishes to read more of the review than is displayed.

Product image 230 includes title text of the movie that is reviewed and images of character actors of the movie. Product image 230 provides a visual connection of a reader of the review to the product being reviewed, in this case a particular movie. Other products, services or information may include images or video to readily connect a reader of a review to the item being reviewed. Embodiments of the present invention make use of the review content by the contributing reviewer and the data associated with readers of the review, such as the number or quantity of "likes", the quantity of comments, the quantity of shares, and in some embodiments, the quantity of views, to determine positive product reviewers and their reputation scores.

Like selection 240 is a link within online review 205 that is used by a reader of online review 205 to indicate that the reader "likes" the content provided by the reviewer. The reader may like the information provided, the opinion of the reviewer, the style of the reviewer's content, or may like the reviewer. Reviewer qualifier program 300 uses the quantity of likes as input in determining a reputation score for a reviewer. The more likes associated with a reviewer, the greater the reputation score of the reviewer (which in embodiments of the present invention is associated with a more popular, more trusted, or more favored reviewer). Input from like selection 240 is tabulated and displayed on most social media sites, and is represented in online review 205 by total likes 270. In some social media sites, an alternative expression may be used to indicate a favorable impression of the review, such as displaying a message that "(some quantity) of people that found this information (online review 205) useful".

Comment selection 250 is a link within online review 205 that is used by a reader of online review 205 to provide a comment that is posted in a form of an addendum to online review 205 (not shown). Comment selection 250 enables readers to respond to review content 220 of online review 205 and agree, disagree, or comment otherwise on review content 220 posted by the reviewer. The quantity of comments submitted by use of review content 220 is tabulated and displayed by total comments 280. The quantity and or sentiment content of comments may be used as input in determining a reputation score for a reviewer, for example, by reviewer qualifier program 300. In some embodiments of the present invention, the more comments associated with a reviewer, the greater the reputation score of the reviewer. In other embodiments, the content of comments may be analyzed to determine the quantity or percentage of comments that are positive or neutral (as opposed to negative), as a contributing factor to a reputation score of the original reviewer.

Share selection 260 is a link within online review 205 that is used by a reader of online review 205 to distribute access to the review to other readers that are known contacts within a computing device of the reader selecting to share the review. Share selection 260, when selected, may initiate an email for the reader, to send a link and title of the online review to one or more other users. In other embodiments, share selection 260 may offer a connecting link to one or more other social media sites to which the reader may post a duplicate copy of the review. The quantity of "shares" for a review may be used as input, for example, by reviewer qualifier program 300, in determining a reputation score for a reviewer (not shown in FIG. 2). In some embodiments of the present invention, the more often a review associated with a reviewer is shared, the greater the reputation score of the reviewer. In some embodiments, the quantity of shares may be available, but not displayed, as is the case for online review 205, whereas in other embodiments, the quantity of shares may be prominently displayed within the review.

Total likes 270 displays the total number (quantity) of times that like selection 240 has been selected by readers of online review 205. Similarly, total comments 280 reflects the number of times a reader has input a comment to online review 205, and total views 290 indicates the quantity of readers that linked to and viewed a display of online review 205. Embodiments of the present invention are not limited by the data associated with reader contact and interaction with online review 205 presented in the example of FIG. 2. Additional data collected by a social media site that includes reviews of products, services, or information may be used to generate a reputation score.

A reputation score is calculated to distinguish reviewers that generate higher levels of interaction and response, and as such have a following of readers/viewers that may be perpetuated through social media networks. A reputation score for reviewers that have been determined to provide positive reviews of products, services, or information, may include a calculation and/or combination of the quantity of "likes", "comments", "shares", "views", recommendations, and other data collected by the social media site, such as the effectiveness of the reviewer of a product to generate positive sentiment within the social media. For example, a reputation score may require the total views of the online review to exceed a minimum quantity, for example 100 views. Reviews having fewer views would not be considered for reputation score determination; however, in some embodiments of the present invention, reviewers having posted multiple positive product reviews may have the data from all positive reviews aggregated to determine a reputation. Following the example, reviews having more than 100 views may have the quantity of likes and comments combined and compared to the quantity of views, for example a percentage of likes and comments, of the total quantity of views. In the example, the calculated percentage may be the reputation score of the reviewer, and may be compared to a pre-determined percentage threshold. For the example, reviewers whose reputation score meets the pre-determined threshold condition (greater than the pre-determined percentage threshold) are identified and may be solicited by providers of products, services, or information to provide reviews on previews of items and generate positive network interaction on social media sites as a type of marketing activity.

In some embodiments of the present invention, reviewers may be categorized by the product, service, or information on which they provide reviews. Providers may use the categorization information in selection of reviewers to solicit for providing reviews of products, services, or information, for example, a sneak preview of a product, or test trial of a service.

Figure 3:
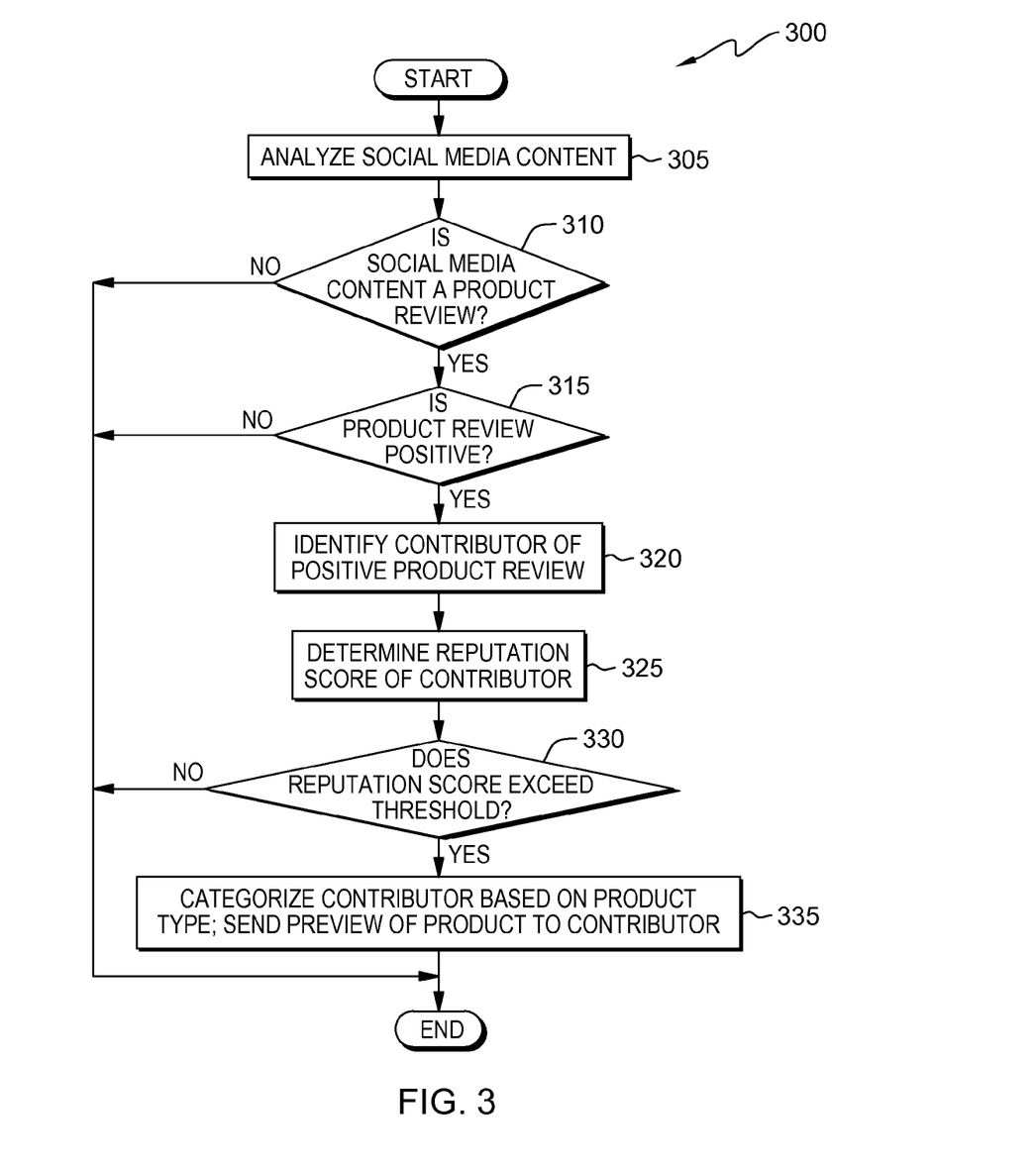
FIG. 3 illustrates operational steps of a reviewer qualifier program, inserted on a social media server within the distributed computer processing environment of FIG. 1, in accordance with an embodiment of the present invention.

FIG. 3 illustrates operational steps of reviewer qualifier program 300, inserted on a social media server within the distributed computer processing environment of FIG. 1, in accordance with an embodiment of the present invention. In some embodiments of the present invention, reviewer qualifier program 300 resides on a social media server, such as social media server 110, and has access to social media content of the server and information to contact contributors of the social media content. In other embodiments, social media applications may send social media content to reviewer qualifier program 300 for analysis and determination of content that is a positive product (or service or information) review.

In step 305 reviewer qualifier program 300 analyzes social media content from one or more social media sites. Reviewer qualifier program 300 analyzes the text content of social media entries associated with users as contributors to the social media site. In some embodiments of the present invention, reviewer qualifier program 300 parses the text and performs semantic analysis on the social media content entries to determine the subject of the content and the action, activity, or description associated with the determined subject. In some embodiments of the present invention, reviewer qualifier program 300 may use look-up-tables of commonly used and known words and phrases to facilitate determination of the subject and predicate of the social media entry content. In some embodiments of the present invention, symbols, acronyms, abbreviation, such as those used in text messaging, emoticons, and images, may be included in the social media content entries, and reviewer qualifier program 300 may apply use of online dictionaries or databases that include one or a combination of symbols, acronyms, and abbreviations, to facilitate subject matter and description determination. In other embodiments, optical character recognition techniques and image recognition techniques may also be applied to determine the subject matter and subject description or activity of the social media content entry.

In decision step 310, reviewer qualifier program 300 determines if the social media content of an entry is a product review. The results of the semantic analysis performed on the social media entries are used to determine whether the subject matter and description or discussion associated with the subject matter of the entry is directed to a product review. Identifying a product review includes a subject matter that names a particular product or product type, and the social media content entry includes discussion regarding description of attributes and function of the product. Having determined that a social media content entry is not directed to a product review (step 310, "NO" branch), reviewer qualifier program 300 ends.

Having determined that a social media content entry is directed to a product review (step 310, "YES" branch), reviewer qualifier program 300, in decision step 315, determines whether the product review of the content entry is a positive review. In some embodiments of the present invention, sentiment analysis is used in addition to the semantic analysis previously performed, to determine whether the product review is a positive review. Sentiment analysis is the use of natural language processing, text analysis, and computational linguistics to identify and extract subjective information in source materials that includes determining the attitude of a content contributor with respect to some topic, which may be the contributor's judgment or evaluation. The sentiment analysis determines whether the product review of a social media contributor (the reviewer) is positive. In some embodiments of the present invention, keywords and determination of the absence or presence of negative qualifiers, as well as analysis of emoticons, abbreviations, and punctuation performed by reviewer qualifier program 300 in step 305, may be included in determining whether a product review is positive.

Having determined that the product review is not positive (step 315, "NO" branch), reviewer qualifier program 300 ends. For the case in which reviewer qualifier program 300 determines that the product review is positive (step 315, "YES" branch), reviewer qualifier program 300, in step 320, identifies the contributor of the positive product review (identifies the reviewer). In some embodiments of the present invention, reviewer qualifier program 300 determines the contributor (reviewer) of the positive product review of the social media content entry, based on the user identification (user ID) associated with the social media entry, and access to the social media application's profile information of users of the social media site. Reviewer qualifier program 300 may obtain contact information for a contributor of a positive product review from access to the social media profile information. One of ordinary skill in the art will recognize that reviewer qualifier program 300 may obtain the ID of reviewers by access to, or receipt from, other social media contributor ID sources, and embodiments of the present invention are not limited by how the reviewer is identified.

In step 325, reviewer qualifier program 300 determines the reputation score of the contributor of the positive product review. Having identified the reviewer that created a positive product review within a social media entry, in some embodiments of the present invention, reviewer qualifier program 300 determines if there are additional positive product reviews posted by the same contributor. Reviewer qualifier program 300 analyzes the available social media data associated with the one or more positive product reviews posted by the same contributor to determine a reputation score for the contributor, relative to the posting of positive product reviews. In some embodiments, the social media data used for determining a reputation score may include, but is not limited to, the quantity of "likes", "comments", "shares", and "views", associated with the social media entries of a contributor. In some embodiments, the reputation score for a reviewer may be determined for a single social media site, whereas in other embodiments, positive product reviews of multiple social media sites may be combined and used to determine a reputation score for the contributor (reviewer).

For example, a reputation score may be determined by summing the quantity of likes, comments, and shares that are recorded for a contributors positive product review entries in one or more social media sites, and the summed total is divided by the total quantity of views of the posted positive product review entries. The resulting fraction may be expressed as a percentage as a reputation score. In other embodiments of the present invention, weights may be placed on particular data elements tabulated for social media entries that are considered to have a higher importance in determining a reputation score. For example, "likes" or "shares" may be considered to be more important than "comments" and may be double weighted (×2) in determining a sum total. In other embodiments, a social media positive product review that has been viewed by a large quantity of users (for example >1000 views) may establish a high reputation score for the reviewer (by applying a multiple, e.g. ×3), based on the audience base that has viewed the review.

The reputation score is used to differentiate contributing reviewers based on the response data associated with the review. In some embodiments, a high reputation score is associated with a reviewer that produces a higher volume of social media data element totals, and in general produces indications of larger user views and positive response to the product reviews. For example, a reviewer may have a following of users that access, read, and indicate a response to the social media entries of the reviewer. The quantity of "like" responses may be an indicator that the content of the reviewer's positive product review includes information or presentation that the reading user finds of value. The quantity of "share" responses may be an indicator that the reading user finds the positive product review significant enough to bring to the attention of one or more other users, which broadens the quantity of user contacts that are made aware of the product and the associated positive review. In some embodiments of the present invention, reviewer qualifier program 300 determines if the reviewer has a relationship with the manufacturer or product provider, and may modify reputation scores depending upon the determined relationship.

In decision step 330, reviewer qualifier program 300 determines whether a reputation score of a reviewer meets a predetermined threshold condition. In some embodiments of the present invention a threshold condition for a reputation score is determined to distinguish the reviewers that may have greater contact and influence presence on the social media site, relative to positive product reviews, and may provide alternate effective marketing channels for providers of products (services, or information). The predetermined threshold condition may be determined based on historic data and information, may be initially set based on the desired quantity of reviewers to consider for additional product reviews, or may be determined by some other approach, for example, determined by having >100 views of a positive product review.

Having determined that the reputation score of a reviewer does not meet the predetermined threshold condition of reputation scores, reviewer qualifier program 300 ends. For the case in which reviewer qualifier program 300 determines that the reputation score of a reviewer does meet the predetermined threshold condition of reputation score, reviewer qualifier program 300, in step 335, may perform a categorization of the review and may classify the reviewer, based on the product type of the positive product review. Classifying, or categorizing the reviewers of online product reviews facilitates reviewer selection activities by manufacturers and product providers. In some embodiments, a manufacturer or product provider may enable a reviewer having a reputation score that meets a predetermined threshold condition, to provide a proactive product review by sending a preview of a product along with information requesting the reviewer to perform a review of the product. In some embodiments, the manufacturer or product provider may offer enticements or incentives to the reviewer to perform a review of a product. Positive product online reviews may be published to other web sites, such as the product producer's own product page, or further distributed to other social media sites and forums.

In some embodiments of the present invention, the reviewer is categorized based on the product type of the product for which the reviewer generated a positive review. Reviewer qualifier program 300 applies the semantic analysis results to determine the product type of the review, and establish the categorization of the contributing reviewer's review. A reviewer may perform multiple positive product reviews of varying product types, and as such may receive multiple categorizations. In some embodiments, the reputation scores and categorization information are available to product (service and information) providers. Product reviewers may be ranked by their reputation scores, and may be grouped based on categorizations performed by reviewer qualifier program 300. The rankings of product reviewers can be made available to product manufacturers and providers, from which the providers may contact and send previews of a product to the contributing reviewer having a reputation score meeting the pre-determined threshold condition, and having a particular product type categorization. Having categorized the reviewer, and having sent a preview of a product to the categorized contributor, reviewer qualifier program 300 ends.

In some embodiments of the present invention, the provider of a product, service, or information may elect to send a product, or access to a service or information that may not be a preview, but may be an available and established product, service, or information set, with an intent to potentially generate more interest from social media channels. The provision sent to the reviewer may be a link to information regarding a product or service, or may be to a product or service the reviewer can access online.

Figure 4:
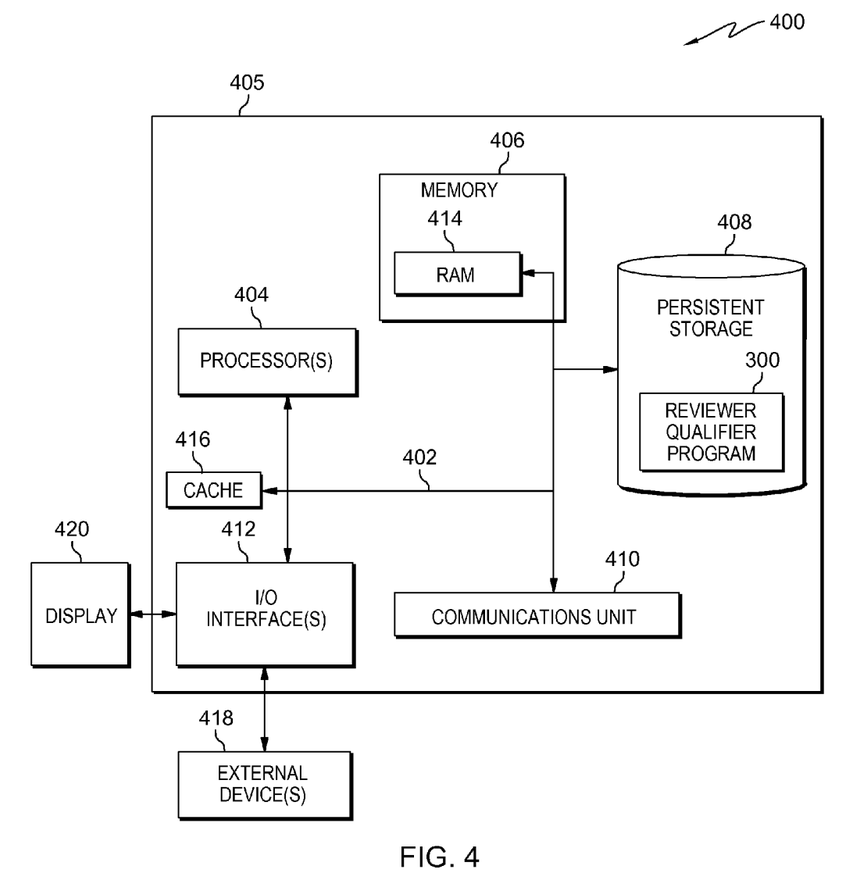
FIG. 4 depicts a block diagram of components of a computing device capable of operationally performing the reviewer qualifier program, in accordance with an embodiment of the present invention.

FIG. 4 depicts a block diagram of components of computing system 400, including computing device 405, capable of operationally performing reviewer qualifier program 300, in accordance with an embodiment of the present invention.

Computing device 405 has components similar to social media server 110 and computing device 120, and includes components and functional capability in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Reviewer qualifier program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed computer processing environment 100, social media server 110, product provider computing device 130, and computing devices 405 and 120. In these examples, communications unit 410 includes one or more network interface cards. Communications unit 410 may provide communications through the use of either or both physical and wireless communications links. Reviewer qualifier program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., reviewer qualifier program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining online content contributors, the method comprising:

receiving, by one or more processors, a plurality of postings from a plurality of online social media sites, each posting of the plurality of postings comprised of content that is unstructured;

parsing, by one or more processors, the unstructured content of a posting of the plurality of postings, and performing a semantic analysis on the unstructured content in which combinations of the parse unstructured content are analyzed with respect to online resources that are accessed to determine a meaning of a subject of the posting and a description of the subject of the posting;

parsing, by one or more processors, the unstructured content of the posting, and analyzing combinations of the parsed unstructured content with respect to known sentiment terms, based on performing sentiment analysis and determining a sentiment of the posting;

determining, by one or more processors, whether the unstructured content of the posting, from the plurality of online social media sites is associated with a first subject and includes a commentary of the first subject that refers positively to the first subject;

determining, by one or more processors, a contributor of the posting of the plurality of postings of online social media sites, in response to determining the unstructured content of the posting includes a commentary associated with the first subject, and refers positively to the first subject;

generating, by one or more processors, a level of influence of the contributor of the posting based, at least in part, on a quantity of positive commentaries generated by the contributor that are directed to the first subject, and a quantity and sentiment of response data associated with the quantity of positive commentaries, from users accessing the posting of the plurality of postings of the plurality of online social media sites;

determining, by one or more processors, whether the level of influence of the contributor of the positive commentaries associated with the first subject meets a predetermined threshold condition of the quantity of the positive commentaries associated with the first subject, and the quantity and sentiment of the response data associated with the positive commentaries; and identifying, by one or more processors, the contributor, based on the level of influence of the contributor meeting the predetermined threshold condition of the quantity of the positive commentaries associated with the first subject and the quantity and sentiment of the response data associated with the positive commentaries.

2. The method of claim 1, further comprising:

in response to the contributor of the positive commentaries associated with the first subject having the level of influence that meets the predetermined threshold condition, enabling, by one or more processors, the contributor to perform a proactive commentary of a second subject.

3. The method of claim 1, wherein the response data associated with the quantity of the positive commentaries is based on a combination of: a quantity of "likes" associated with the positive commentaries, a quantity of "shares" associated with the positive commentaries, a quantity of recommendations associated with the positive commentaries, comments associated with the positive commentaries, and positive sentiment created as a result of the positive commentaries.

4. The method of claim 1, wherein the commentary of the first subject further comprises:

determining, by one or more processors, whether the commentary of the first subject, generated by the contributor, is positive; and in response to determining the review of the first subject is positive, promoting, by one or more processors, the commentary of the first subject that is positive on a plurality of social media sites.

5. The method of claim 2, wherein the second subject is a service and the contributor of the positive commentaries having a level of influence that meets the predetermined threshold condition, receives information to access the service and perform a proactive commentary of the service.

6. The method of claim 1, further comprising:

in response to determining that the contributor has a level of influence that meets the predetermined threshold condition, providing incentive, by one or more processors, to the contributor to access a second subject and generate a second commentary.

7. The method of claim 1, wherein the level of influence of the contributor of the positive commentaries of the first subject includes modifying the level of influence based on a relationship of the contributor with a provider of the first subject.

8. A computer program product for determining online content contributors, the computer program product comprising:

one or more computer readable storage media wherein the computer readable storage medium is not a transitory signal per se, and program instructions stored on the one or more computer readable storage media, the program instructions comprising:

program instructions to receive a plurality of postings from a plurality of online social media sites, each posting of the plurality of postings comprised of content that is unstructured;

program instructions to parse the unstructured content of a posting of the plurality of postings, and performing a semantic analysis on the unstructured content in which combinations of the parse unstructured content are analyzed with respect to online resources that are accessed to determine a meaning of a subject of the posting and a description of the subject of the posting;

program instructions to parse the unstructured content of the posting, and to analyze combinations of the parsed unstructured content with respect to known sentiment terms, based on performing sentiment analysis and determining a sentiment of the posting;

program instructions to determine whether the unstructured content of the posting, from the plurality of online social media sites is associated with a first subject and includes a commentary of the first subject that refers positively to the first subject;

program instructions to determine a contributor of the posting of the plurality of postings of online social media sites, in response to determining the unstructured content of the posting includes a commentary associated with the first subject that refers positively to the first subject;

program instructions to generate a level of influence of the contributor of the posting based, at least in part, on a quantity of positive commentaries generated by the contributor that are directed to the first subject, and a quantity and sentiment of response data associated with the quantity of positive commentaries, from users accessing the posting of the plurality of postings of the plurality of online social media sites;

program instructions to determine whether the level of influence of the contributor of the positive commentaries associated with the first subject meets a predetermined threshold condition of the quantity of the positive commentaries associated with the first subject, and the quantity and sentiment of the response data associated with the positive commentaries; and program instructions to identify the contributor, based on the level of influence of the contributor meeting the predetermined threshold condition of the quantity of the positive commentaries associated with the first subject and the quantity and sentiment of the response data associated with the positive commentaries.

9. The computer program product of claim 8, further comprising:

in response to the contributor of the positive commentaries associated with the first subject having a level of influence that meets the predetermined threshold condition, program instructions to enable the contributor to perform a proactive commentaries of a second subject.

10. The computer program product of claim 8, wherein the response data associated with the quantity of the positive commentaries is based on a combination of: a quantity of "likes" associated with the positive commentaries, a quantity of "shares" associated with the positive commentaries, a quantity of recommendations associated with the positive commentaries, comments associated with the positive commentaries, and positive sentiment created as a result of the positive commentaries.

11. The computer program product of claim 8, wherein the commentaries of the first subject further comprises:

program instructions to determine whether the commentaries of the first subject, generated by the contributor, is positive; and in response to determining the commentaries of the first subject is positive, program instructions to promote the commentaries of the first subject that is positive on a plurality of social media sites.

12. The computer program product of claim 9, further comprising:

program instructions identifying the second subject as a service; and in response to determining the contributor of positive commentaries having a reputation that meets the predetermined threshold condition, program instructions to send to the contributor, information to access the service and perform a proactive commentaries of the service.

13. The computer program product of claim 8, wherein the level of influence of the contributor of positive commentaries of the first subject includes modifying the level of influence based on a relationship of the contributor with a provider of the first subject.

14. A computer system for determining online content contributors, the computer system comprising:

one or more computer processors, one or more computer readable storage media, program instructions stored on the computer readable storage media for execution by at least one of the one or more processors, the program instructions comprising:

program instructions to receive a plurality of postings from a plurality of online social media sites, each posting of the plurality of postings comprised of content that is unstructured;

program instructions to parse the unstructured content of a posting of the plurality of postings, and performing a semantic analysis on the unstructured content in which combinations of the parse unstructured content are analyzed with respect to online resources that are accessed to determine a meaning of a subject of the posting and a description of the subject of the posting;

program instructions to parse the unstructured content of the posting, and to analyze combinations of the parsed unstructured content with respect to known sentiment terms, based on performing sentiment analysis and determining a sentiment of the posting;

program instructions to determine whether the unstructured content of the posting, from the plurality of online social media sites is associated with a first subject and includes a commentary of the first subject that refers positively to the first subject;

program instructions to determine a contributor of the posting of the plurality of postings of online social media sites, in response to determining the unstructured content of the posting includes a commentary associated with the first subject that refers positively to the first subject;

program instructions to generate a level of influence of the contributor of the posting based, at least in part, on a quantity of positive commentaries performed generated by the contributor that are directed to the first subject, and a quantity and sentiment of response data associated with the quantity of positive commentaries, from members accessing the posting of the plurality of postings of the plurality of online social media sites;

program instructions to determine whether the level of influence of the contributor of the positive commentaries associated with the first subject meets a predetermined threshold condition of the quantity of the positive commentaries associated with the first subject, and the quantity and sentiment of the response data associated with the positive commentaries; and program instructions to identify the contributor, based on the level of influence reputation of the contributor meeting the predetermined threshold condition of the quantity of the positive commentaries associated with the first subject and the quantity and sentiment of the response data associated with the positive commentaries.

15. The computer system of claim 14, further comprising:
in response to the contributor of the positive commentaries associated with the first subject having a level of influence that meets the predetermined threshold condition, program instructions to enable the contributor to perform a proactive commentary of a second subject.

16. The computer system of claim 14, wherein the response data associated with the quantity of the positive commentaries is based on a combination selected from a group of: a quantity of "likes" associated with the positive commentary, a quantity of "shares" associated with the positive commentary, a quantity of recommendations associated with the positive commentary, comments associated with the positive commentary, and positive sentiment created as a result of the positive commentary.

17. The computer system of claim 15, further comprising:
program instructions identifying the second subject as a service; and
in response to determining the contributor of the positive commentaries having a level of influence that meets the predetermined threshold condition, program instructions to send to the contributor, information to access the service and perform a proactive commentary of the service.

18. The computer system of claim 14, wherein the level of influence of the contributor of the positive review of the first product of the product type includes modifying the level of influence based on a relationship of the contributor with a provider of the first subject.

19. The method of claim 1, wherein determining, by one or more processors, whether the posting of the content from the plurality of online social media sites is associated with the first subject, includes determining whether the posting of the content from the plurality of online social media sites is associated with one of: a service and a set of information.

* * * * *